US008939253B1

(12) United States Patent
Zaman et al.

(10) Patent No.: US 8,939,253 B1
(45) Date of Patent: Jan. 27, 2015

(54) SYSTEM AND METHOD FOR SUPPRESSION OF UNWANTED NOISE IN GROUND TEST FACILITIES

(71) Applicant: The United States of America as represented by the Administrator of the National Aeronautics and Space Administration, Washington, DC (US)

(72) Inventors: Khairul B. M. Q. Zaman, Strongsville, OH (US); Michelle M. Clem, Cleveland, OH (US); Amy F. Fagan, Cleveland, OH (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/871,114

(22) Filed: Apr. 26, 2013

Related U.S. Application Data

(63) Continuation of application No. 61/639,335, filed on Apr. 27, 2012.

(51) Int. Cl.
*E04F 17/04* (2006.01)
*F02C 7/045* (2006.01)

(52) U.S. Cl.
CPC .......... *F02C 7/045* (2013.01)
USPC .......... 181/224

(58) Field of Classification Search
USPC .......... 181/210, 212, 213, 224
See application file for complete search history.

(56) References Cited

U.S. PATENT DOCUMENTS

| | | | | |
|---|---|---|---|---|
| 2,823,756 | A * | 2/1958 | Bridge et al. | 181/203 |
| 2,864,455 | A | 12/1958 | Hirschorn | |
| 2,936,846 | A | 5/1960 | Tyler et al. | |
| 2,979,151 | A * | 4/1961 | Blackwell et al. | 181/217 |
| 2,987,136 | A | 6/1961 | Lilley et al. | |
| 3,120,877 | A * | 2/1964 | Morris et al. | 181/217 |
| 3,159,238 | A * | 12/1964 | Shearer | 181/213 |
| 3,165,167 | A | 1/1965 | Miller et al. | |
| 3,187,835 | A | 6/1965 | Smith | |
| 4,036,452 | A | 7/1977 | Schairer | |
| 5,717,172 | A * | 2/1998 | Griffin et al. | 181/215 |
| 6,092,621 | A | 7/2000 | Kinzie | |
| 6,343,672 | B1 * | 2/2002 | Petela et al. | 181/224 |
| 7,717,229 | B2 | 5/2010 | Putnam | |
| 7,918,310 | B1 | 4/2011 | Helgeson et al. | |
| 8,210,308 | B2 * | 7/2012 | Penner et al. | 181/224 |
| 8,307,948 | B2 * | 11/2012 | Parodi | 181/258 |
| 2011/0088966 | A1 * | 4/2011 | Geyer, III | 181/224 |

* cited by examiner

*Primary Examiner* — Forrest M Phillips
(74) *Attorney, Agent, or Firm* — Robert H. Earp, III

(57) ABSTRACT

Systems and methods for the suppression of unwanted noise from a jet discharging into a duct are disclosed herein. The unwanted noise may be in the form of excited duct modes or howl due to super resonance. A damper member is used to reduce acoustic velocity perturbations at the velocity antinode, associated with the half-wave resonance of the duct, weakening the resonance condition and reducing the amplitudes of the spectral peaks.

20 Claims, 6 Drawing Sheets

SYSTEM AND METHOD FOR SUPPRESSION OF UNWANTED NOISE IN GROUND TEST FACILITIES

CROSS-REFERENCE TO RELATED APPLICATIONS

This application claims the benefit of U.S. Provisional Patent application Ser. No. 61/639,335 entitled Suppression of Unwanted Noise and Howl in a Test Configuration Where a Jet Exhaust is Discharged Into a Duct filed Apr. 27, 2012. The entirety of the above-noted application is incorporated by reference herein.

FIELD OF THE INVENTION

This application relates generally to the suppression of unwanted noise and howl in a test configuration, for example, where jet engine exhaust is routed through a duct, and more specifically to systems and methods for reducing unwanted noise and howl utilizing a damper.

BACKGROUND

In test configurations, a jet engine exhaust is sometimes discharged into a duct or pipe to carry it out of, and away from, the test chamber, e.g., in large-scale jet engine tests with hot flows. In addition to the "regular" jet exhaust noise, unwanted high intensity noise is sometimes encountered in such test facilities. The unwanted noise is primarily due to the duct resonance modes excited by the jet exhaust. When the preferred mode frequency of the jet matches a duct resonant frequency there can be a locked-in super resonance or howl. Even in the absence of the locked-in resonance noise, high levels of unwanted noise may occur due to the duct modes excited by broadband disturbances of the jet. The latter noise is referred to in the following as 'excited duct mode noise' while the intense noise due to super resonance is referred to in the following as 'howl'. The howl is a special case of the excited duct mode noise, and the terminology unwanted noise is used to cover both the howl and the excited duct mode noise.

The unwanted noise is problematic and can obstruct jet engine test efforts hindering aeroacoustic measurements and interfering with flow data. It can be difficult or impossible to obtain accurate test measurements of aspects of the engine's performance in the presence of the unwanted noise. Worst cases of howl may involve increased unsteady aerodynamic loads raising structural concerns of damage to the engine and/or the test setup.

Various methods for suppression of the howl have been explored, however, attempts to solve this problem have not been particularly successful. For example, protrusions or tabs placed at the periphery of the inlet of the duct and longitudinal fins located inside the duct have been found to be ineffective. A rod inserted perpendicular to the exhaust flow at different axial locations may be effective for suppressing the howl but must be painstakingly positioned, maneuvered or adjusted for a specific test setup through trial and error. Furthermore, even if a rod is effective for suppressing the howl, tests show that neither the rod nor the tabs are effective for suppressing the excited duct mode noise.

SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Suppression of the unwanted noise in a jet engine test configuration where a jet exhaust is routed through a duct can be achieved through the use of a damper member engaged with the duct. The damper reduces, or eliminates, noise due to both the howl and the excited duct mode noise. The system and method of the disclosure are effective to dampen the acoustic velocity fluctuations at the pressure node, weakening the resonance condition. The elimination of unwanted noise provides more reliable, repeatable test conditions, minimizes the impact of the noise on the test measurements and reduces concerns of structural damage to jet engine and test configuration.

To accomplish the foregoing and related ends, certain illustrative aspects of the disclosure are described herein in connection with the following description and the annexed drawings. These aspects are indicative, however, of but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

DETAILED DESCRIPTION

Figure 1:
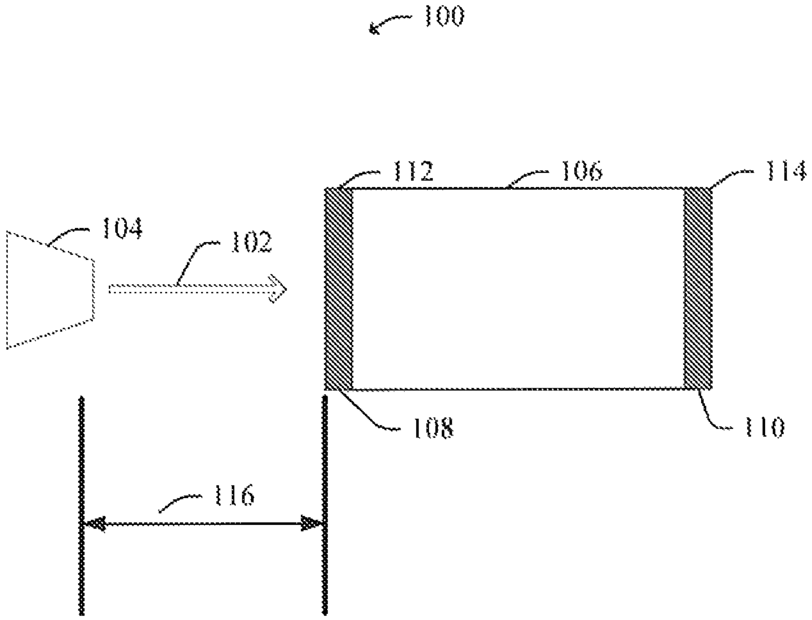
FIG. 1 is an illustration of an example jet engine nozzle, exhaust duct and damper member in accordance with an embodiment of the disclosure.

Instability characteristics of a jet exhaust and the acoustic resonance characteristics of the exhaust duct, or collector, play a role in the mechanisms of unwanted noise in test facilities. When there is a confluence of the two (i.e. matching of the frequencies and wavenumbers) there can be a coupling leading to sharp resonance, referred to as super resonance. The problem is akin to such phenomena as 'whistles', 'ring-tones', and the like. Often, the noise is generated due to a coupling of the jet preferred mode and the half-wave acoustic resonant frequencies of the duct.

The resonance may also be due to an excitation of the first and second transverse acoustic modes, or flapping modes, of the duct. The phenomenon is facility and configuration dependent involving a wide range of geometric parameters as well as operating conditions.

For example, the duct can be of varying sizes and shapes (e.g. cylindrical, oval, and rectangular). The duct can be of constant diameter or divergent. In some cases, a particular portion or section of the duct, terminated by junctions where the area of the cross-section changes, may be responsible for the resonance. The jet exhaust nozzle-to-duct diameter ratio may vary. The stand-off distance, the distance between the nozzle and the duct, can vary. The nozzle geometry influences the characteristics of the jet plume entering the duct and the flow can vary in Mach numbers and temperatures. Thus, the nature of the excited modes is not the same for all test configurations. Further, the excited acoustic modes of the duct induced by the turbulence of the flow may be enough to raise the noise to unacceptable levels even in the absence of a locked-in super resonance or howl. The noise suppression system and method of the disclosure is effective over a wide range of test conditions and varying geometry.

The disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the disclosure can be practiced without these specific details. In other instances, well-known structures and devices are shown in block diagram form in order to facilitate describing the disclosure.

While specific characteristics are described herein, it is to be understood that the features, functions and benefits of the disclosure can employ characteristics that vary from those described herein. These alternatives are to be included within the scope of the disclosure and claims appended hereto.

While, for purposes of simplicity of explanation, the one or more methodologies shown herein, are shown and described as a series of acts, it is to be understood and appreciated that the subject disclosure is not limited by the order of acts, as some acts may, in accordance with the disclosure, occur in a different order and/or concurrently with other acts from that shown and described herein. For example, those skilled in the art will understand and appreciate that a methodology could alternatively be represented as a series of interrelated acts or events. Moreover, not all illustrated acts may be required to implement a methodology in accordance with the disclosure.

With reference now to the figures. As illustrated in FIG. 1, in system 100, exhaust flow 102 exits a component, for example, jet engine exhaust nozzle 104 and proceeds through duct 106. Duct 106 includes an inlet opening 108 and an outlet opening 110. In aspects of the disclosure, either inlet opening 108 or outlet opening 110 may be a junction where there is a turn or a cross-sectional area change in the duct 106. The duct 106 may comprise any cross-sectional shape. The duct 106 can be a diffuser. The duct inlet 108 is positioned at a stand-off distance 116 from the nozzle 104.

Damper member 114 is positioned at the outlet 110 of the duct 106. Alternately, or in addition to damper member 114, damper member 112 is positioned at the inlet 108 of the duct 106. The position of damper members 112, 114 corresponds to the acoustic velocity anti-node, that is, where the acoustic velocity fluctuation magnitude is greatest for specific cases of excited duct modes.

In accordance with embodiments of the present disclosure, damper member 112, and/or damper member 114, is engaged with the duct 106. The damper members may be either removably, or fixedly attached to the duct 106 and remain effective, without re-positioning or adjustments, from test to test since the noise suppression effect of the damper members is not dependent on any specific engine geometry or other test condition.

The damper members 112, 114 function as acoustic velocity fluctuation dampers suppressing the excited duct mode noise and the howl. In an embodiment, damper members 112, 114 comprise wire mesh screens, or other porous structures, attached to the duct inlet 108 and outlet 110, respectively.

Figure 2:
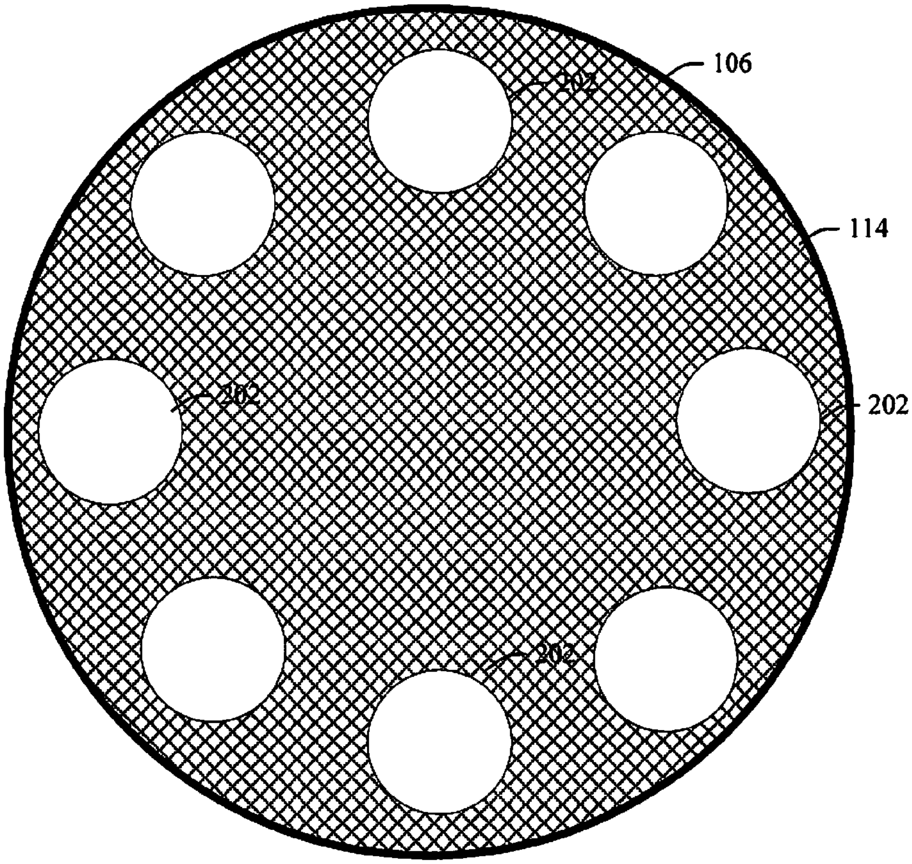
FIG. 2 is an illustration of a damper member in accordance with an embodiment of the disclosure.

Turning to FIG. 2, damper member 114 is positioned at the outlet end of duct 106. Damper 114 may comprise, for example, a mesh screen for dampening the acoustic velocity fluctuations at the outlet of the duct 106, which in turn suppresses the unwanted noise by weakening the resonant condition. Damper member 112 at the inlet 108 can similarly suppress the unwanted noise. However, due to its proximity to the incoming jet there may be additional broadband noise owing to impingement of the high speed flow on damper 112.

In an aspect, damper member 114 may include openings 202 to reduce flow blockage. The openings 202 are located along the periphery of the damper member 114. The acoustic velocity fluctuation is the strongest in the center of the duct cross-section and falls off to zero at the duct wall 106. Openings 202 near the periphery of the damper member 114 are effective in reducing flow blockage. Openings 202 are shown as circular although the openings 202 can have most any size or shape that allows sufficient passage for the exhaust flow through the damper member 114.

Figure 3:
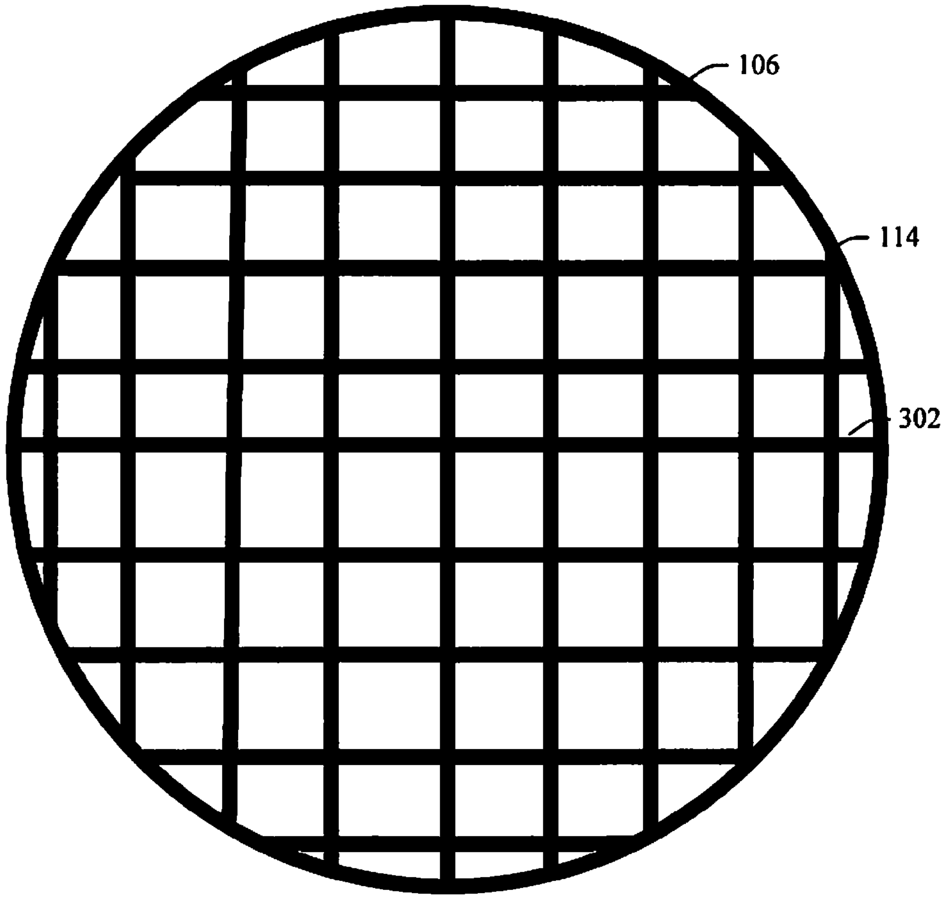
FIG. 3 is an illustration of a damper member in accordance with an embodiment of the disclosure.

As shown in FIG. 3, damper member 114 is positioned at the outlet end of duct 106. Damper 114 can be a metal grate 302 that dampens the acoustic velocity fluctuations at the outlet of the duct 106 and suppresses the unwanted noise. The metal grate 302 of damper member 114 may comprise, for example, a carbon steel, galvanized carbon steel, high carbon steel, stainless steel, aluminum, or nickel material and alloys thereof. In an aspect, metal grate may comprise air-cooled or water-cooled tubes to reduce the heat associated with the jet exhaust.

Figure 4:
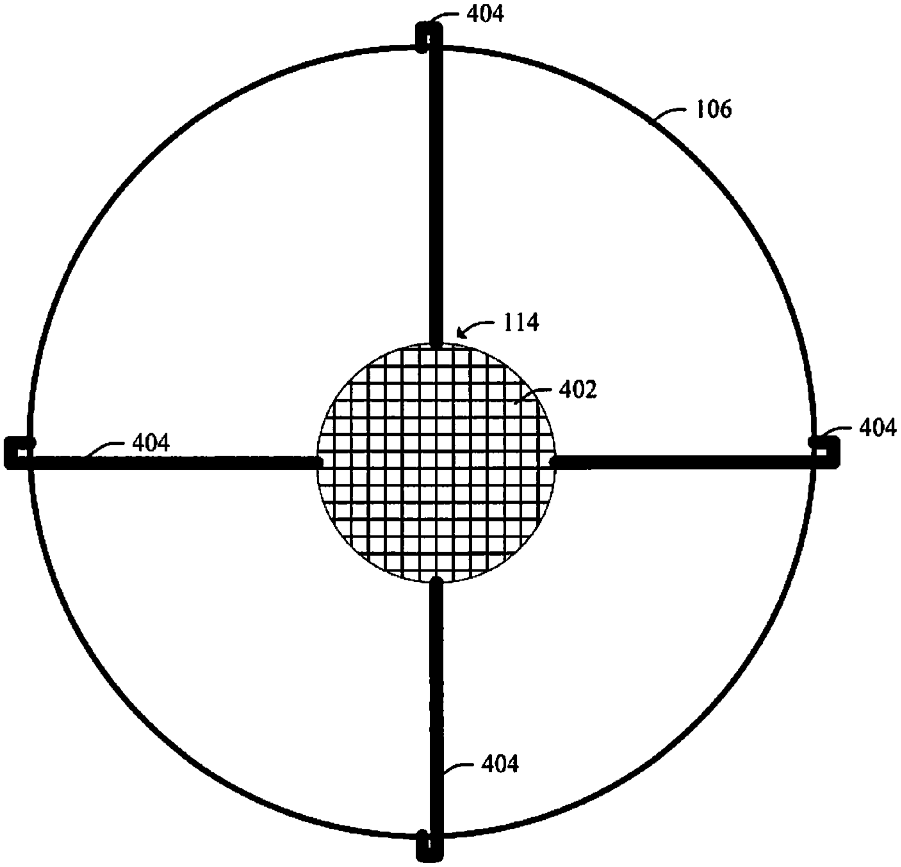
FIG. 4 is an illustration of a damper member in accordance with an embodiment of the disclosure.

As shown in FIG. 4, damper member 114 is positioned at the outlet end of duct 106. In an embodiment, damper 114 comprises a center body 402 that dampens the acoustic velocity fluctuations at the outlet of the duct 106 and thereby suppresses the unwanted noise. The center body 402 of damper 114 can be comprised of a porous material, such as a mesh screen or grate. In some embodiments, center body 402 of damper 114 comprises a solid mass. The center body 402 of damper 114 includes support structures 404 for securing and centering the damper center body 402 to the duct 106. The support structures 404 may comprise rigid struts or flexible material capable of withstanding the jet engine exhaust. Support structures 404 can be of the same material as the damper center body or may comprise a different material. Support structures 404 can be integral to the damper center body 402 or the support structures 404 can comprise separate components that are attached to the damper center body 402.

Figure 5:
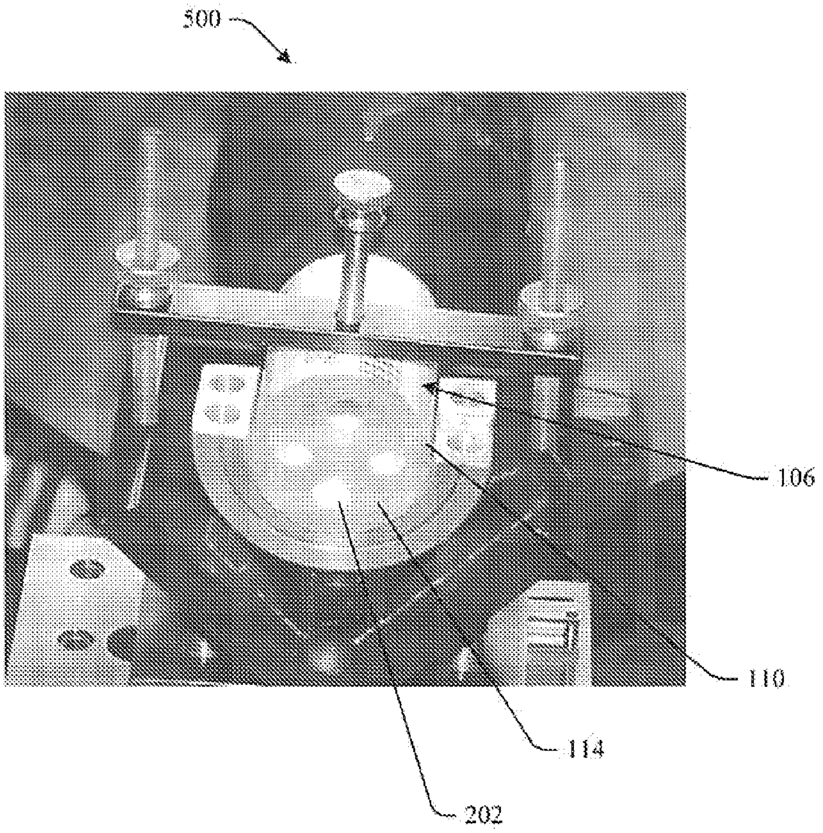
FIG. 5 is an example of a model-scale experimental test set-up in accordance with an embodiment of the disclosure.

FIG. 5 is an example of a model-scale experimental test set-up 500 in accordance with an embodiment of the present disclosure. An exhaust flow exits a jet engine exhaust nozzle and proceeds through duct 106. Duct 106 is positioned at a stand-off distance from the exhaust nozzle. Damper member 114 is positioned at the outlet 110 of the duct 106. The position of the damper members 114 corresponds to the acoustic velocity anti-node, that is, where the acoustic velocity fluctuation magnitude is the greatest.

The model-scale experiment includes duct 106 comprising a 1 inch diameter×2 inch long cylindrical pipe placed in the path of a 0.58 inch diameter circular jet. The example damper member 114 is a 70-mesh screen with four ¼ inch diameter openings 202 provided to alleviate exhaust flow blockage. In aspects, the jet nozzle may be non-circular and the duct may be of most any other cross-sectional shape. The damper member 114 can be a screen covering the cross-section of the duct 106. Openings 202 placed on the periphery of the damper member 114 near the duct wall 106 can be provided to alleviate flow blockage.

Turning now to a discussion of testing, testing has been conducted utilizing the model-scale experiment 500 as illustrated in FIG. 5, and other experimental test configurations. Results have shown that the damper member is effective for suppressing unwanted noise, including both the howl and the excited duct mode noise, in the test configuration.

Figure 6:
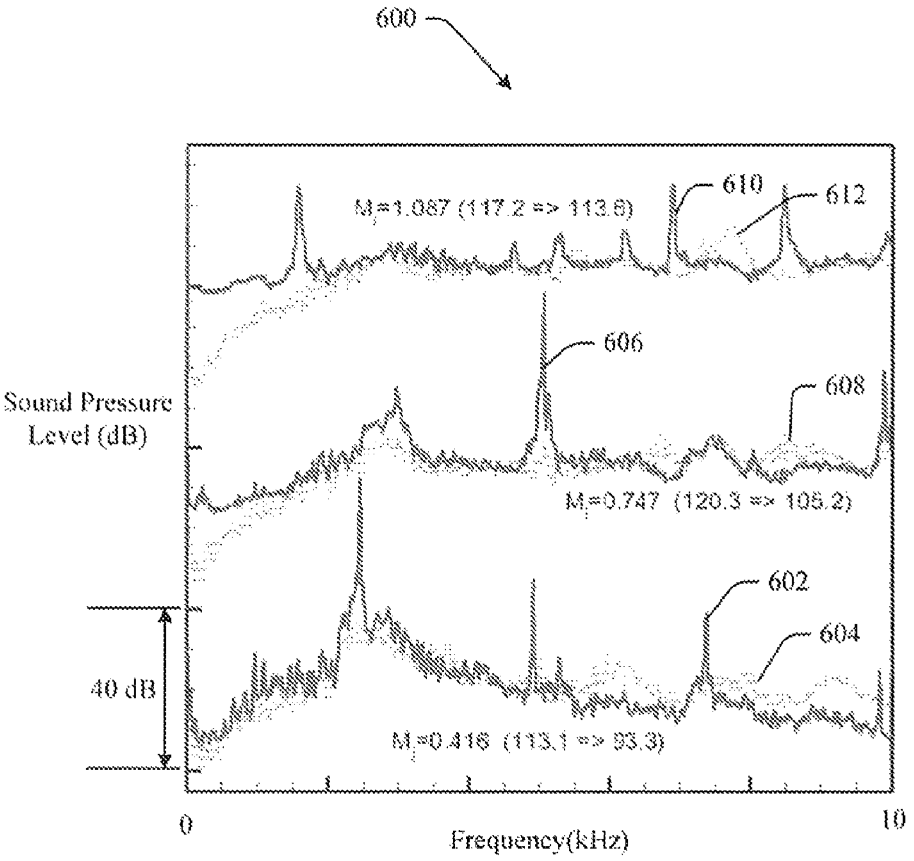
FIG. 6 is a graph illustrating test results achieved in accordance with embodiments of the disclosed system and method.

FIG. 6 is a graph 600 illustrating test results, utilizing test set-up 500, achieved in accordance with embodiments of the disclosed system and method. Three pairs of sound pressure level spectra are shown for jet Mach numbers of 0.416, 0.747 and 1.087. Lines 602 and 604 represent test data collected for Mach number 0.416. Lines 606 and 608 represent test data collected for Mach number 0.747. Lines 610 and 612 represent test data collected for Mach number 1.087.

In each pair, one spectrum (solid lines 602, 606, 610) demonstrates data collected in the test setup without the damper. A loud tone is present as indicated by the sharp spikes in the spectra (602, 606, 610). The other spectra (dashed lines 604, 608, 612) represent test data collected with the damper member installed as indicated in FIG. 5. The test data reveals that the tone indicated by the sharp spikes is present in the test set-up without the damper member and the tone is eliminated by the inclusion of the damper member. The changes in overall sound pressure level in dB are indicated in parentheses. In the model-scale geometry at the two lower Mach numbers, the tone is generated due to a coupling of the jet 'preferred mode' and the half-wave acoustic resonant frequencies of the duct. The damper location corresponds to the acoustic velocity anti-node, that is, where the acoustic velocity fluctuation magnitude is the largest. By dampening the acoustic velocity fluctuation the resonance condition is weakened resulting in the noise suppression.

At jet Mach number 1.087, the duct modes can be more complex, however as shown in FIG. 6, the damper member is still effective. FIG. 6 represents a test case when there is a coupling, as described above, yielding a sharp tone corresponding to a howl in a larger practical configuration. Unwanted noise can appear as a broad peak at the duct resonant frequencies when the dimensions of the jet and the duct are disparate and there is no coupling. The damper is found to be effective in suppressing such excited duct mode noise which remains unaffected by other previously known suppression methods. Further tests showed that the damper at the inlet location produces some additional broadband noise due to flow impingement even though the overall noise is suppressed.

What has been described above includes examples of the disclosure. It is, of course, not possible to describe every conceivable combination of components or methodologies for purposes of describing the subject disclosure, but one of ordinary skill in the art may recognize that many further combinations and permutations of the disclosure are possible. Accordingly, the disclosure is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system that suppresses unwanted noise and howl in a test facility comprising:

jet engine exhaust created within an engine test facility;

an airflow duct having an inlet to take in the jet engine exhaust and an outlet;

a diffuser connected to the outlet for routing the jet engine exhaust from the engine test facility; and at least one damper member engaged with the airflow duct to suppress unwanted noise and howl created within the airflow duct.

2. The noise suppression system of claim 1, wherein the at least one damper member is engaged with at least one of the inlet or the outlet of the airflow duct.

3. The noise suppression system of claim 1, wherein the at least one damper member weakens a duct resonance condition and reduces corresponding acoustic spectral peaks.

4. The noise suppression system of claim 1, wherein the at least one damper member comprises a mesh screen.

5. The noise suppression system of claim 4, wherein the mesh screen covers at least a portion of at least one of the inlet or the outlet of the airflow duct.

6. The noise suppression system of claim 1, wherein the damper member comprises a grate that covers at least a portion of at least one of the inlet or outlet of the airflow duct.

7. The noise suppression system of claim 1, wherein the damper member includes openings along a periphery of the damper member.

8. The noise suppression system of claim 1, wherein the damper member comprises a solid body centrally positioned within at least one of the inlet or outlet of the airflow duct.

9. The noise suppression system of claim 1, wherein the damper member comprises a carbon steel, galvanized carbon steel, high carbon steel, stainless steel, aluminum, or nickel material and alloys thereof.

10. The noise suppression system of claim 1, wherein the damper member comprises at least one of air-cooled or water-cooled tubes.

11. A method for suppressing unwanted jet engine exhaust noise and howl in a test facility comprising:

routing the jet engine exhaust through an airflow duct having an inlet and an outlet;

routing the jet engine exhaust from the outlet to a diffuser; and engaging at least one damper member with the airflow duct, wherein the at least one damper member suppresses a portion of the jet engine exhaust noise and howl.

12. The method for suppressing jet exhaust noise of claim 11, wherein engaging the at least one damper member comprises affixing the at least one damper member to at least one of the inlet or the outlet of the airflow duct.

13. The method for suppressing jet exhaust noise of claim 11, wherein engaging the at least one damper member comprises attaching a mesh screen damper member to at least one of the inlet or the outlet of the airflow duct.

14. The method for suppressing jet exhaust noise of claim 13, wherein engaging the at least one mesh screen damper member comprises covering at least a portion of the inlet or outlet of the airflow duct.

15. The method for suppressing jet exhaust noise of claim 11, wherein engaging the at least one damper member comprises attaching a grate covering at least a portion of the inlet or outlet of the airflow duct.

16. The method for suppressing jet exhaust noise of claim 11, wherein engaging the at least one damper member comprises attaching a damper member having openings along a periphery of the damper member.

17. The method for suppressing jet exhaust noise of claim 11, wherein engaging the at least one damper member comprises attaching a damper member having a solid body, and centrally positioning the damper body within at least one of the inlet or the outlet of the airflow duct.

18. The method for suppressing jet exhaust noise of claim 11, wherein engaging the at least one damper member comprises weakening a duct resonance condition and reducing corresponding acoustic spectral peaks.

19. The method for suppressing jet exhaust noise of claim 11, wherein engaging the at least one damper member comprises fixedly engaging the damper member with the duct.

20. The method for suppressing jet exhaust noise of claim 11, wherein engaging the at least one damper member comprises engaging a damper member comprised of at least one a carbon steel, galvanized carbon steel, high carbon steel, stainless steel, aluminum, or nickel material and alloys thereof.

* * * * *